United States Patent [19]

Oboshi et al.

[11] Patent Number: 4,615,207
[45] Date of Patent: Oct. 7, 1986

[54] PROGRESSIVE METAL MOLD APPARATUS FOR PRODUCTION OF LAMINATED IRON CORES

[75] Inventors: Takamitsu Oboshi, Fukuoka; Tomoaki Koga; Eiji Imoto, both of Kitakyushu, all of Japan

[73] Assignee: Mitsui High-Tec, Inc., Kitakyushu, Japan

[21] Appl. No.: 655,898

[22] Filed: Sep. 28, 1984

[30] Foreign Application Priority Data

Sep. 30, 1983 [JP] Japan ................................. 58-183734

[51] Int. Cl.⁴ ............................................. B21J 11/00
[52] U.S. Cl. ........................................ 72/404; 72/400
[58] Field of Search ........................... 72/400, 404, 407

[56] References Cited

U.S. PATENT DOCUMENTS

| 3,128,731 | 4/1964 | Hamilton | 72/404 |
|---|---|---|---|
| 4,088,005 | 5/1978 | Starr | 72/404 |
| 4,272,978 | 6/1981 | Berecz | 72/404 |
| 4,272,980 | 6/1981 | Carrieri | 72/404 |

Primary Examiner—W. D. Bray
Attorney, Agent, or Firm—Spensley Horn Jubas & Lubitz

[57] ABSTRACT

In a metallic mold apparatus, a rotational power for a skewing operation and a rotational power for an indexing operation are applied through a differential gear device to a rotatably supported die. More specifically, the skew power from such an electric motor as a servomotor operative in synchronism with a press operation and the indexing power from an index means operatively coupled to a press are applied to the differential gear device.

11 Claims, 13 Drawing Figures

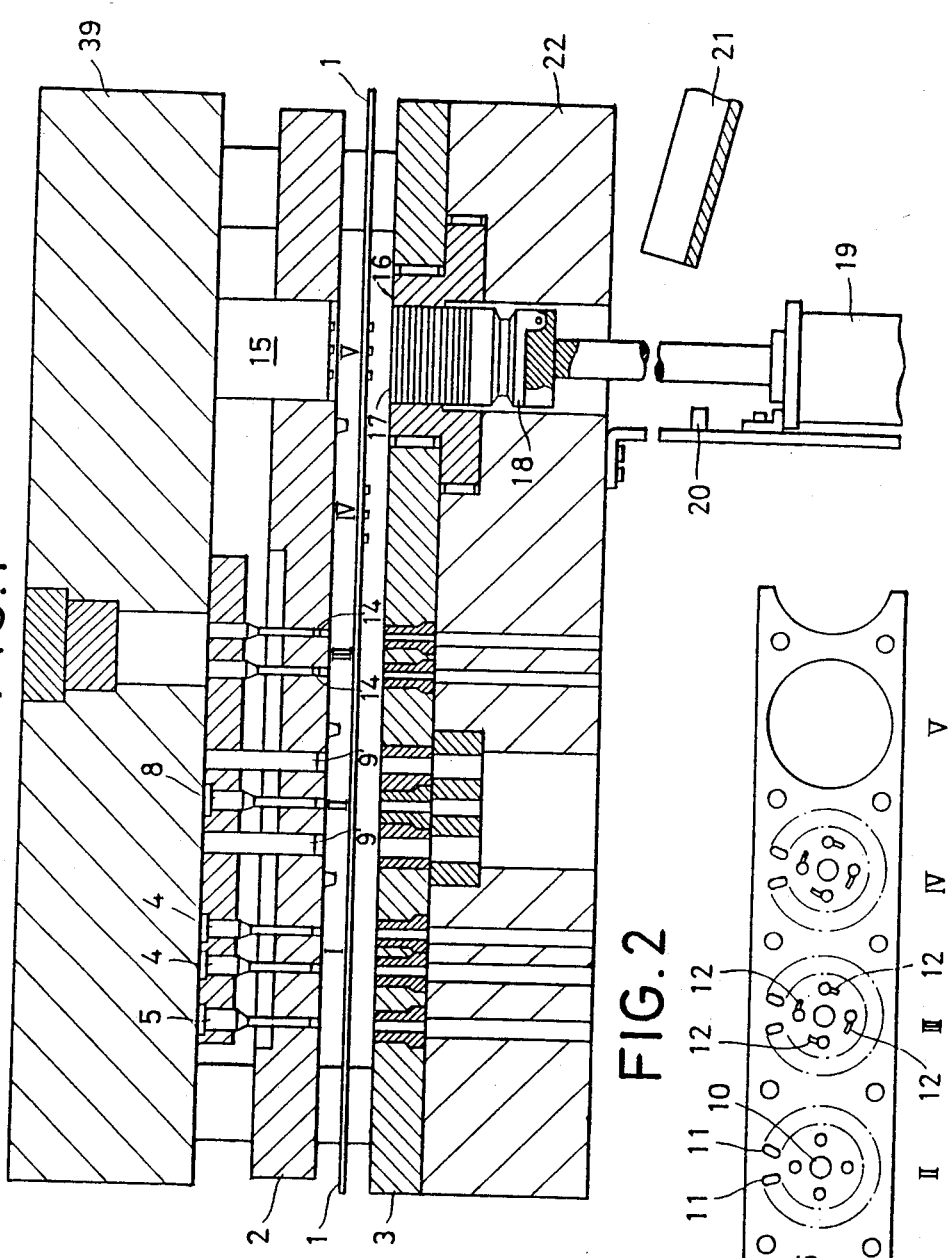

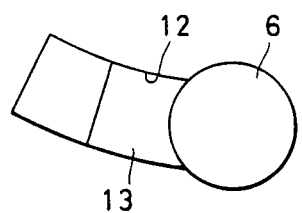
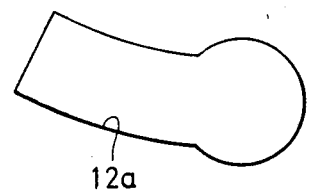
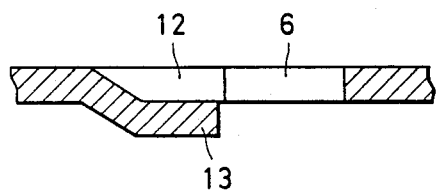
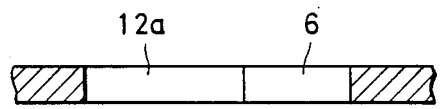
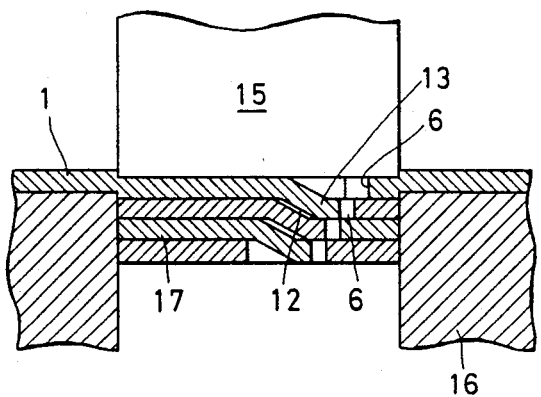

PROGRESSIVE METAL MOLD APPARATUS FOR PRODUCTION OF LAMINATED IRON CORES

BACKGROUND OF THE INVENTION

1. Field of the Invention

The present invention relates to a progressive metallic mold apparatus for production of laminated iron cores which has two functions, that is, a skewing function for the purpose of forming slant or skew slots in a laminated iron core and a rotation-laminating function (hereafter called index function) for the purpose of removing unfavorable irregularities in the thickness of the respective iron core sheets or pieces.

2. Description of the Prior Art

There is well known a progressive metallic mold apparatus which has a so-called skewing function for formation of slots in a laminated iron core, for example, as disclosed in U.S. Pat. No. 3,110,831.

In this type of metallic mold apparatus, iron core pieces are made by sequentially blanking a strip material and drawing them into a die by means of a punch and a laminated iron core is obtained by sequentially stacking and calking the drawn core pieces within the die.

Meanwhile, the thickness of the strip material is not uniform due to the inherent strain of a roller used in its rolling operation of the strip production. Accordingly, the core pieces made of the strip material have also an uneven thickness with one side being always thicker than the other. The respective iron core pieces drawn into the die are stacked as mutually shifted by a skew angle but with substantially the same attitude. Therefore, these core pieces have the above-mentioned directional property in the thickness, and thus the resultant laminated iron core made out of such pieces may be inclined as shown in FIG. 11, depending on the degree of the piece's irregularity.

Such a disadvantage can be prevented by a socalled indexing operation, that is, by rotating the die by an angle of 90° or 180° just prior to the blanking of the strip material. However, this requires a large-sized and complicated apparatus and thus there has not been suggested so far a metallic mold apparatus which can have such an indexing function and the earlier-mentioned skewing function.

SUMMARY OF THE INVENTION

It is an object of the present invention to realize a progressive metal mold apparatus for production of laminated iron cores with a simple mechanism which has both the skewing and indexing functions.

Such an object of the present invention is achieved by providing a metallic mold apparatus comprising an electric motor driven in synchronism with the operation of a press, index means operatively coupled to the press and a differential gear device.

The differential gear device comprises a differential box and a first rotary shaft, one being driven by the electric motor for skewing and the other being driven by the indexing means for indexing;

The present invention has the following effects.

(1) The skewing rotation and the indexing rotation can be both carried out.

(2) Since the electric motor is used as a power source of the skewing rotation, the modification of the skew angle and the selection of the skew direction can be effected electrically. In the case of the prior apparatus performing the skewing rotation by utilizing the rotation of a crank-shaft, when it is desired to change the skew angle and skew direction, the gears of the gear device transmitting a power to the index device must be exchanged requiring a lot of effort.

(3) The rotational powers from the electric motor and press mechanism are supplied through the differential gear device to the die, and therefore the skewing and indexing rotations can be effected in the same timing relation.

BRIEF DESCRIPTION OF THE DRAWINGS

FIG. 1 is a vertical cross-sectional view showing an arrangement of a molding section of a progressive metal mold apparatus in accordance with the present invention;

FIG. 2 is a plan view of a strip material illustrating how the strip is machined therein;

FIG. 3(a) and (b) respectively show enlarged plan and vertical cross-sectional views of a hole-projection portion in the strip of FIG. 2;

FIG. 4(a) and (b) respectively show enlarged plan and vertical cross-sectional views of the hole-projection portion with the projection removed;

FIG. 5 is a vertical cross-sectional view showing a state in which an iron core piece is pressingly cut out of the strip and calked together with the alreadycut core pieces by a punch;

DETAILED DESCRIPTION OF PREFERRED EMBODIMENT

Figure 6:
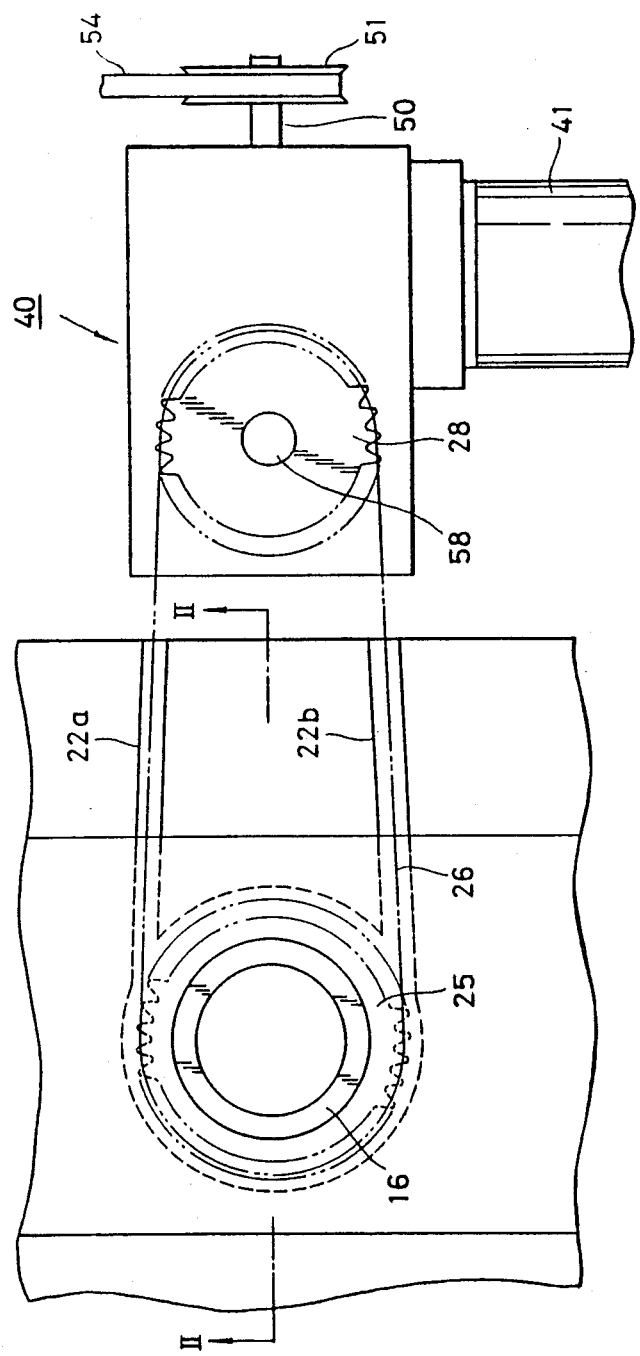
FIG. 6 is a plan view of a rotary die portion and associated rotating means in the apparatus of FIG. 1.

Referring to FIG. 1, there is shown an arrangement of a molding section of a progressive metallic mold apparatus in accordance with the present invention wherein a strip 1 is used as the material of laminated iron cores for motor rotor. The strip 1 is fed into a gap between a strip plate 2 and a die plate 3. At a first station I, the strip 1 is subjected to punching operations by punches 4 and 5 and consequently is formed therein with such round escape holes 6 for skewing and pilot holes 7 as shown in FIG. 2. At a second station II, the strip 1 is subjected to punching operations by punches 8 and 9 to thereby have a shaft hole 10 and slots 11 made therein. At a third station III, holes 12 and projections 13 (refer to FIG. 3(a) and (b)) are made in the strip 1 so that the hole 12 communicates with the associated round escape hole 6. Further, at the third station, the projections 13 are cut off by punches 14 for every feed of the strip by a predetermined amount of pitches, as illustrated in FIG. 4(a) and (b). When this cut-off process has been carried out, the strip is formed therein with through holes 12a corresponding to the projections 13. A fourth station IV is an idle station and thus no machining is done. When reaching a fifth station V, the strip 1 is blanked into iron core pieces 17 constituting a laminated iron core for a rotor by means of a punch 15 and a rotary die 16 and then the pieces 17 are subjected to a skewing and calking operation. More specifically, as shown in FIG. 5, the iron core pieces 17 previously drawn into the die 16 are skewed so that the positions of the slots 11 of both core pieces 17 are shifted by the skew angle relative to each other. The next drawn iron core piece is then stacked so that the projection 13 of the subsequently drawn iron core piece fits into the hole 12 of the previously drawn ones, thereby integrally coupling or calking the iron core pieces Since there is no projection 13 in the through hole 12a of the strip piece shown in FIG. 4(b), the piece cannot be calked or integrally coupled with the hole 12 of the previously drawn piece. As a result, such a piece having the hole 12a is functions as a separating core sheet between the laminated and coupled iron core assemblies each time a predetermined number of such iron core pieces 17 are integrally assembled.

When a predetermined number of such laminated rotor iron cores are mounted on a base 18 pressingly inserted into the die 16, an air cylinder 18 is actuated and the base 18 is moved down. When the base 18 abuts against a projection 20, the base is inclined and the laminated cores are discharged on a shute 21.

Figure 7:
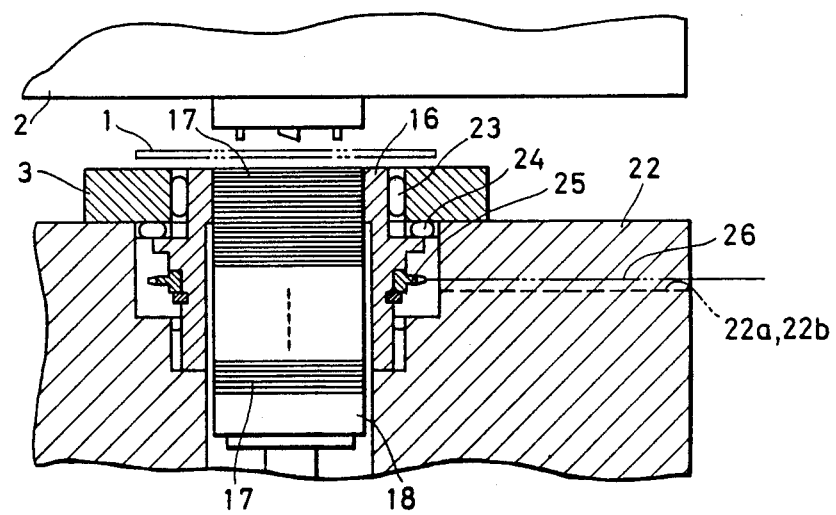
FIG. 7 is a vertical cross-sectional view of the rotary die portion.

As shown in FIGS. 6 and 7 (but not shown in FIG. 1), the die 16 is rotatably supported through bearings 23 and 24 in the die plate 3 and a die holder 22, and is mounted at its outer periphery with a sprocket 25. A link chain 26 engaged to the sprocket 25 extends through grooves 22a and 22b provided in the die holder 22 and runs around a sprocket 28 installed outside the die holder.

The sprocket 28 is fixedly mounted on an output shaft 58 of a gear unit 40 to be described later, which is both rotated for skewing (which will be explained later) by a servomotor 41 and rotated for indexing (which will be explained later) through a shaft 51.

Figure 8:
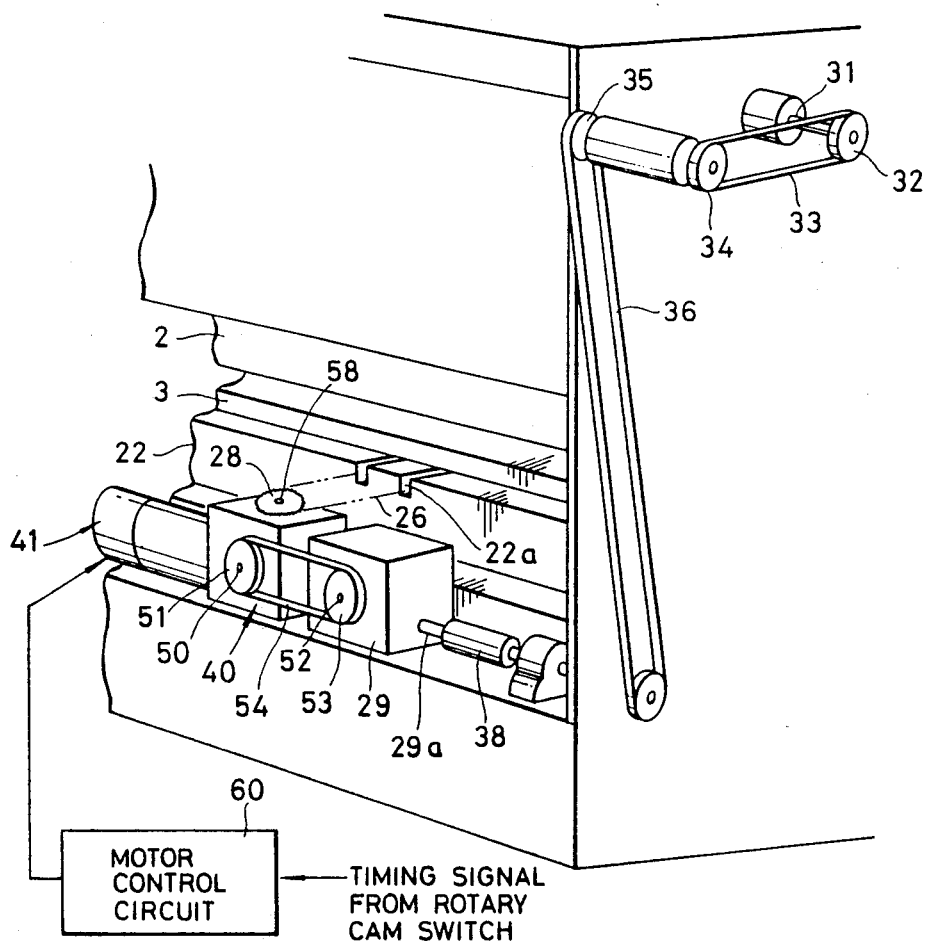
FIG. 8 is a perspective view showing how the rotating means of the rotary die are installed.

As shown in FIG. 8, a known roller-cam index device 29 is provided on one side of the gear unit 40. The index device 29 operates within a 180° range of a 360° press stroke cycle including a top dead center indexing the die 16, for example, at either 90° or 180°.

A pulley 32 is mounted on an end 31 of a crank-shaft (not shown) for the press operation so that the rotation of the crank-shaft is proportionally transmitted through the pulley 32, belt 33, pulleys 34 and 35, belt 36, pulley 37 and universal joint 38 to an input shaft 29a of the roller-cam index device 29.

Figure 9:
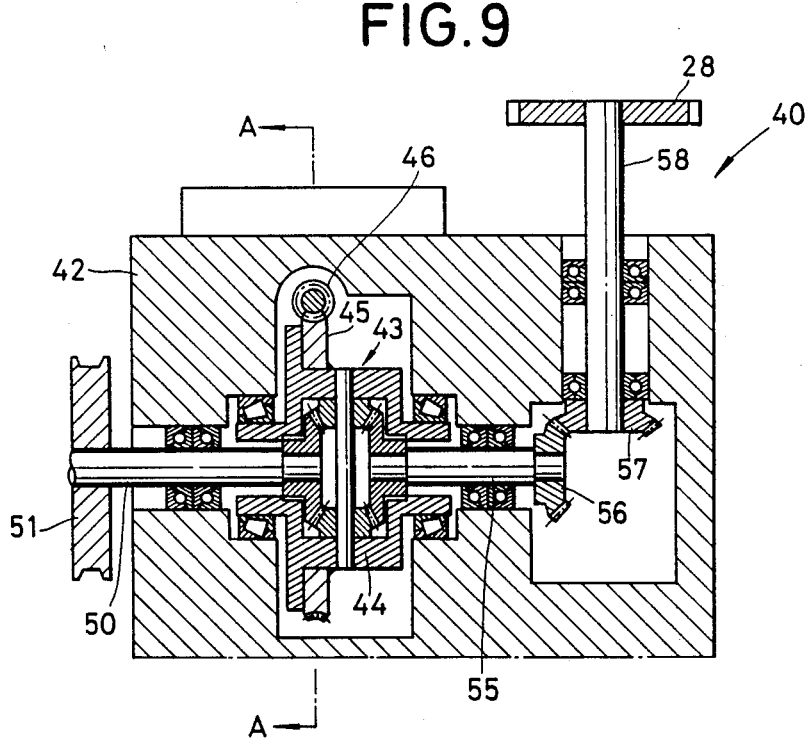
FIG. 9 is a vertical cross-sectional view showing an arrangement of a differential gear device.
Figure 10:
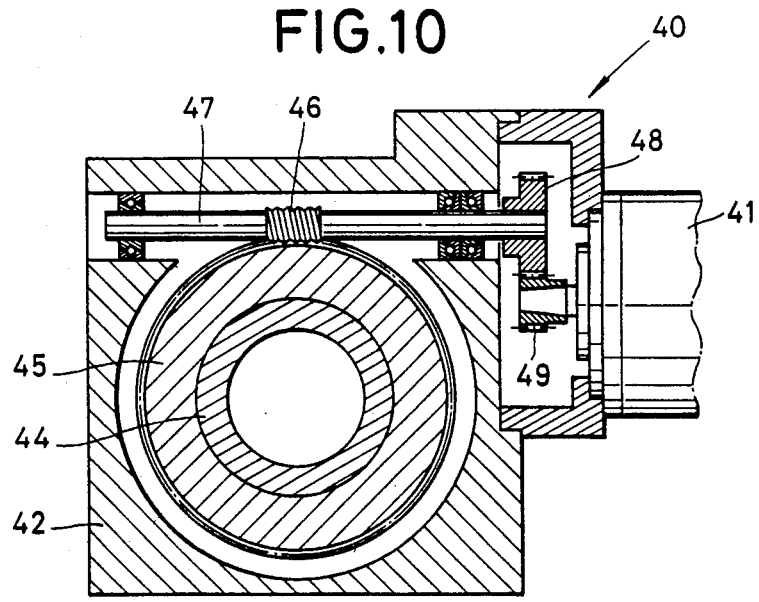
FIG. 10 is a cross-sectional view taken along line A—A in FIG. 9.

FIG. 9 shows a vertical cross-sectional view of the gear unit 40 and FIG. 10 shows a cross-sectional view taken along line A—A in FIG. 9. As illustrated in FIGS. 9 and 10, a differential box 44 of a differential gear device 43 is rotatably supported in a housing 42 and a worm wheel 45 is fitted secured to the outer periphery of the differential box 44.

The worm wheel 45 meshes with a worm 46, and a shaft 47 mounted with the worm 46 is coupled through gears 48 and 49 to a rotary output shaft of the servomotor 41.

A first rotary shaft 50 of the differential gear device 43 extending through the rotary center of the worm wheel 45 is attached with a pulley 51, and as best seen in FIG. 8, a belt 54 runs between the pulley 51 and a pulley 53 attached onto an output shaft 52 of the index device 29. A second rotary shaft 55 of the differential gear device 43 is coupled to the rotary shaft 58 of the sprocket 28 through bevel gears 56 and 57 having an identical number of teeth.

In the differential gear device 43, if the first rotary shaft 50 rotates one turn with the differential box 44 fixed, then the second rotary shaft 55 rotates one turn in the opposite direction to the rotation of the shaft 50. When the differential box 44 rotates one turn with the first shaft 50 fixed, on the other hand, the second shaft 55 rotates two turns in the same direction as the rotation of the box 44.

A motor control circuit 60 shown in FIG. 8 is provided to receive an output signal of a rotary cam switch (not shown) attached to the press as a timing signal for motor drive and control the servomotor 41.

The timing signal is generated just before the punch 15 blanks the strip 1, and the rotation of the servomotor 41 is terminated just before the punch 15 starts its blanking operation.

When the timing signal is applied to the control circuit 60, the servomotor 41 rotates and this rotation is transmitted through the worm 46 and worm wheel 45 to the differential box 44. This causes the rotation of the second rotary shaft 55 of the differential gear device 43 and correspondingly the rotation of the sprocket 28 mounted on the output shaft 58 of the gear unit 40.

The rotation of the sprocket 28 is transmitted through the link chain 26 (see FIGS. 6 and 7) to the sprocket 25 for die rotation, which results in that the die 16 rotates by an angle corresponding to the rotational amount of the motor 41.

Such rotational amount is set so that this setting causes the die 16 to rotate a skew angle (0.1–0.2 degrees, for example). As a result, each time the press operates one stroke, the die 16 rotates a skew angle in a certain duration within the stroke period.

Since the iron core pieces 17 shown in FIG. 1 are pressed into the die 16, the pieces abut at their peripheries against the inner peripheral surface of the die 16 relatively strongly. Accordingly, when the die 16 rotates, the core pieces 17 are rotated integrally together with the die 16.

As mentioned earlier, the skewing rotation of the die 16 by the motor 41 ends immediately before the punch 15 blanks the strip 1. Therefore, just after the skewing rotation of the die 16, a new iron core piece 17 is drawn into the die 16, at which time there takes place a positional shift corresponding to the skew angle between the newly drawn iron core piece 17 and the uppermost one 17 within the die 16. More specifically, the positions of the slots 11 of both core pieces 17 are shifted by the skew angle relative to each other.

In this manner, the iron core pieces 17 are sequentially drawn into the die 16, stacked and calked so that a newly drawn core piece 17 is shifted by the skew angle from the uppermost one 17 with respect to the position of the slot 11. The resultant laminated iron core consisting of stacked iron core pieces 17 has a continuous slot extending in a slant direction therein.

Next, the indexing and stacking operation will be explained. The roller-cam index device 29 receives at its input shaft 29a the transmitted rotation of the crank-shaft, and proportionally rotates the pulley 53 by an angle corresponding to its index angle. The rotation of the pulley 53 is transmitted through the belt 54 and pulley 51 to the first rotary shaft 50 of the differential gear device 43 so that the output shaft 58 of the gear unit 40 rotates. The rotation of the shaft 58 is transmitted to the die 16 through the sprocket 28, link chain 26 and sprocket 25 shown in FIGS. 6 and 7.

In this embodiment, the index device 29 is arranged so that the die 16 turns an angle of 180° during a predetermined time interval within one stroke period of the press. Therefore, each time the press performs its one stroke operation, the iron core pieces 17 within the die 16 rotates an angle of 180° together with the die 16. It goes without saying that, before the punch 15 shown in FIG. 1 blanks the strip 1, the index device 29 terminates its indexing operation.

Figure 11:
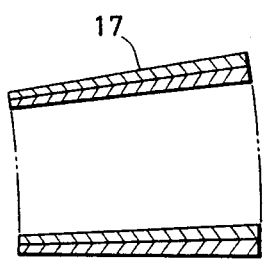
FIG. 11 is a vertical cross-sectional view for explaining how a laminated iron core is inclined when the core pieces having an irregular thickness are stacked.

In this manner, a 180° rotation of the die 16 will cause a 180° positional shift between a new iron core piece 17 drawn into the die 16 and the uppermost one 17 within the die. That is, the indexing operation of the iron core pieces 17 is carried out. As a result, irregularities in the thickness of the respective iron core pieces 17 are averaged and such deformation of the iron core pieces 17 as shown in FIG. 11 can be prevented.

When the operation of the servomotor 41 is timed with the indexing operation of the index device 29, the skew rotation and the indexing rotation can be carried out at the same time.

The rotational output of the servomotor 41 has been applied to the differential box 44 of the differential gear device 43 and the rotational output of the index device 29 has been applied to the first rotary shaft 50 of the gear device 43 in this embodiment, but the former and latter rotational outputs may be applied in the opposite relation to the above case. In this connection, a reduction gear means having a proper reduction ratio is provided between the servomotor 41 and the first rotary shaft 50.

Further, in place of the servomotor 41 shown in the illustrated embodiment, an electric motor such as a pulse motor may be used.

Meanwhile, it is considered to use the rotational power alone of the servomotor 41 for both the skew and indexing operations. In this case, however, the servomotor must rotate at a high speed in a short time to turn the die 16 by an index angle (for example, 180 degrees) and therefore the servomotor must have a very high output torque, which unfavorably results in that an expensive and very large-sized servomotor must be employed. In addition, the 180° rotation of the die 16 by the servomotor in a short time disables the employment of the large reduction ratio, with the disadvantageous result that the accuracy of the rotational angle, especially, the accuracy of the skew angle is remarkably reduced.

What is claimed is:

1. A progressive metal mold apparatus for production of laminated iron cores having a die rotatably provided at a predetermined station in a die plate, said apparatus comprising:
a differential gear device;
an electric motor used as a skewing power source;
a control circuit for rotating said motor by a predetermined number of turns in synchronism with press operation;
index means for producing a rotational power for indexing operation in association with the press operation; and
means for transmitting to said die a rotational power of a second rotary shaft in said differential gear device, wherein an output of said motor is provided to either a differential box or a first rotary shaft, of the differential gear device, and an output of said index means is provided to the other.

2. An apparatus as set forth in claim 1, wherein said power transmitting means comprises a first sprocket disposed around said die, a second sprocket rotated by said second rotary shaft of said differential gear device, and a chain engagedly running between said first and second sprockets.

3. An apparatus as set forth in claim 1, wherein said electric motor is a servomotor.

4. An apparatus as set forth in claim 1 or 3, further comprising a rotary cam switch for giving a signal to said control circuit to start said electric motor. comprising a rotary cam switch for giving a signal to said control circuit to start said electric motor.

5. An apparatus for forming laminated metal cores comprising:
a rotatable die;
means for skewing said die;
means for controlling in synchronization with a press operation, said skewing means;
means for indexing said die through said press operation; and
a differential gear device comprising a second rotary shaft, which is connected to said die; and further comprising a differential gear box and a first rotary shaft, one being driven by said skewing means and the other being driven by said indexing means, such that rotated power is transmitted to said die through said second rotary shaft.

6. A method for controlling an apparatus for forming laminated metal cores comprising:
skewing a rotatable die;
controlling in synchronization with a press operation, said skewing operation;
indexing said die through said press operation; and
transmitting rotational power to said die through a second rotary shaft of a differential gear device, which further comprises a differential gear box and a first rotary shaft, one being driven for skewing and the other being driven for indexing.

7. A control apparatus for use with a punch press for forming laminated metal cores from a continuous metal strip; each core consisting of a plurality of core pieces; each piece being punched by a punch operation; each piece having offset tabs which seat within circularly arranged spaces in the immediately underlying core piece, said spaces separated apart by an index angle; each piece being rotated by a skew angle and stacked in a rotatable die so as to form a slanted slot in said core; said apparatus comprising:
indexing means, operated in synchronization with said punch operation, for rotating by said index angle during said punch operation, said previously stacked underlying pieces with respect to a piece presently being punched;
skewing means, cooperating with said indexing means but separately driven, for further rotating by said skew angle during said punch operation said previously stacked underlying pieces.

8. An apparatus as claimed in claim 7 further comprising:
a differential gear device connected to said rotatable die, said gear device being separately driven by said indexing and said skewing means.

9. An apparatus as claimed in claim 8 wherein said skewing means includes a separate motor connected to said gear device.

10. An apparatus as claimed in claim 8 wherein said indexing means is a stepped linkage to said punch press.

11. An apparatus as claimed in claim 8 wherein said indexing means is a mechanism connected between said punch press and said gear device for converting a press stroke into an output to said gear device to rotate said die by said index angle.

* * * * *